Dec. 28, 1943. E. C. SLOAN ET AL 2,337,575
APPARATUS FOR MAKING FILTERS AND THE LIKE
Original Filed July 15, 1938 4 Sheets-Sheet 1
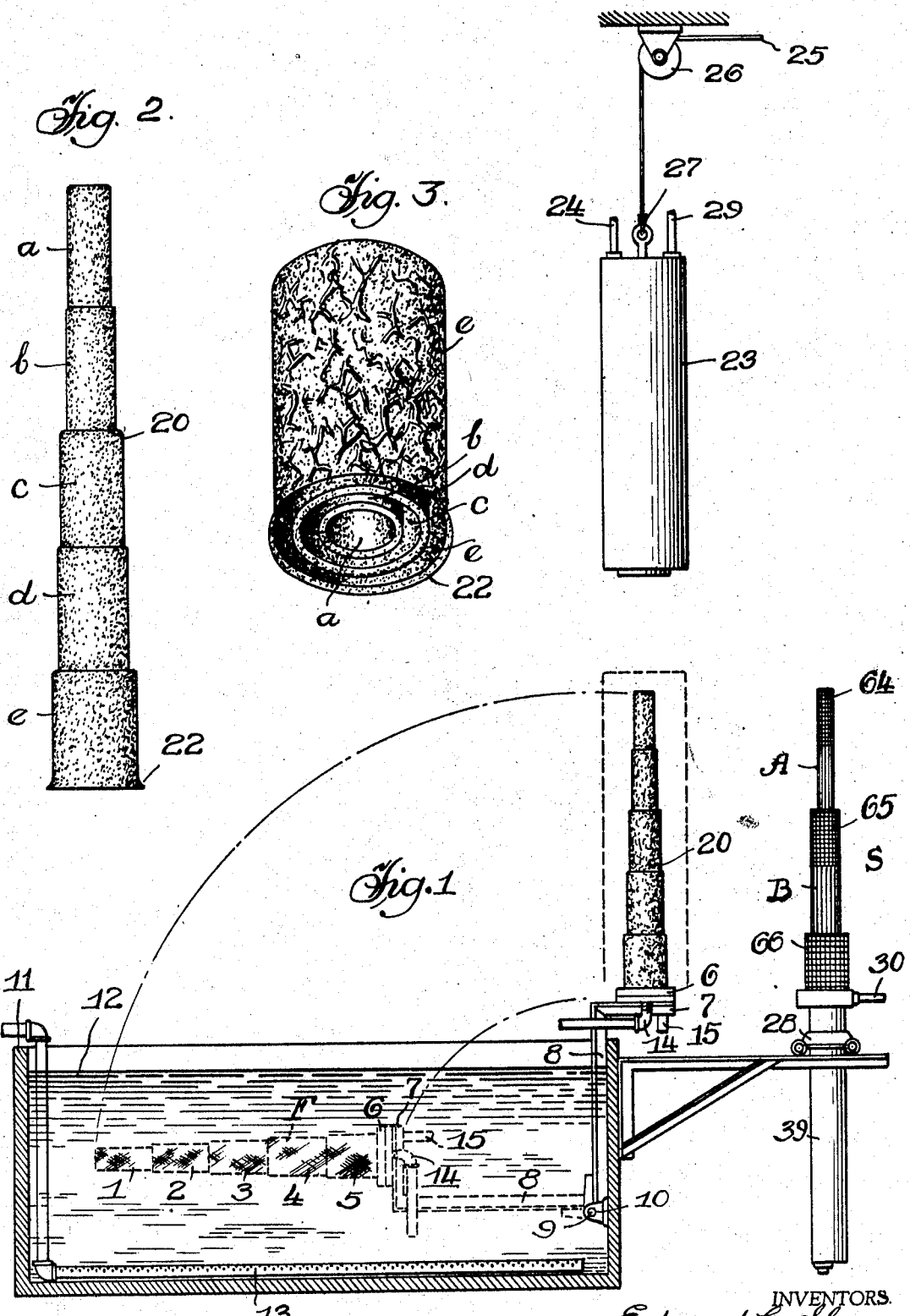
INVENTORS.
Edward C. Sloan,
and Augustus H. Eberman,
By Parkinson + Lane
ATTORNEYS.
Witness:
Chas. R. Kunsh.

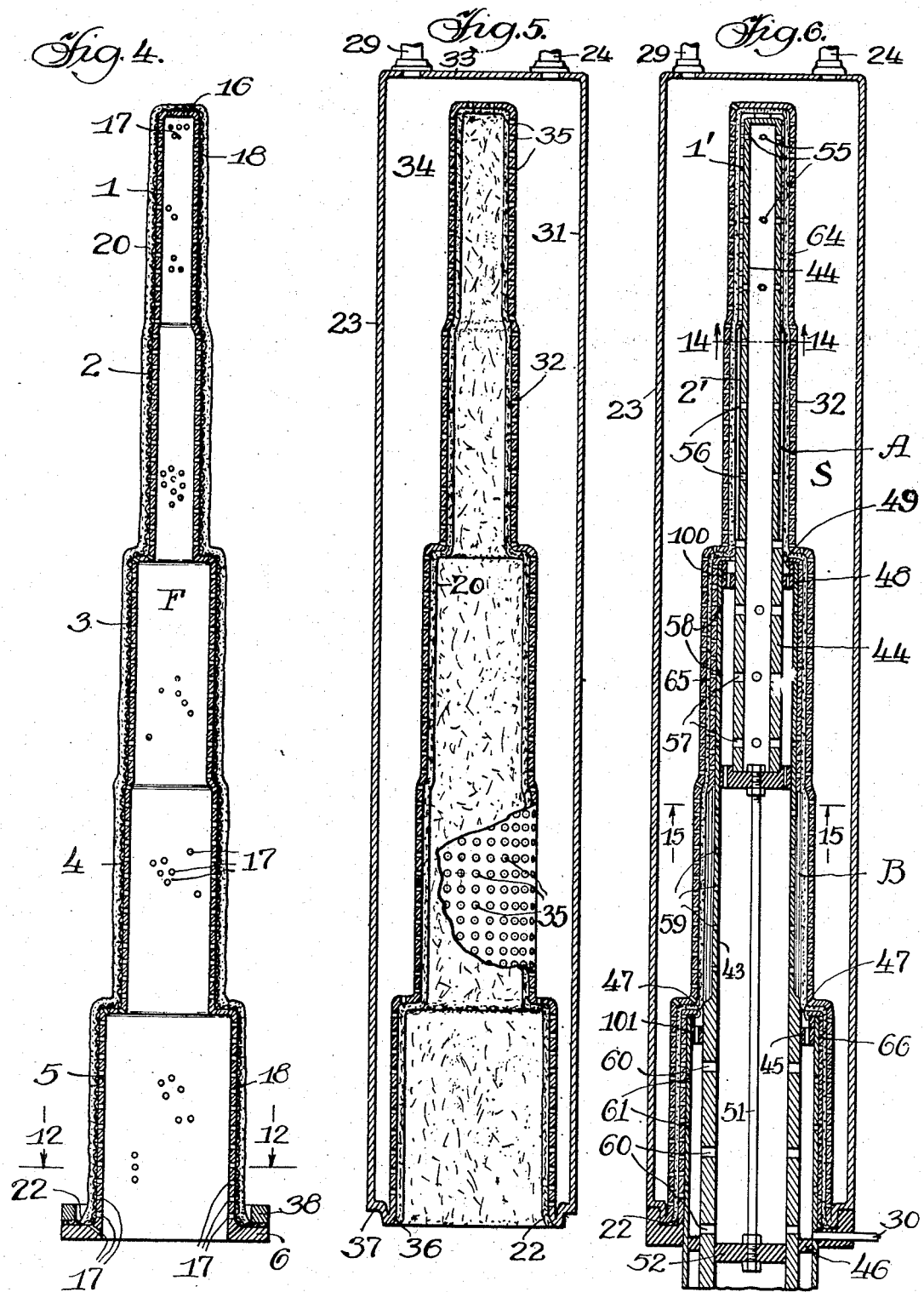

Dec. 28, 1943. E. C. SLOAN ET AL 2,337,575
APPARATUS FOR MAKING FILTERS AND THE LIKE
Original Filed July 15, 1938    4 Sheets-Sheet 3
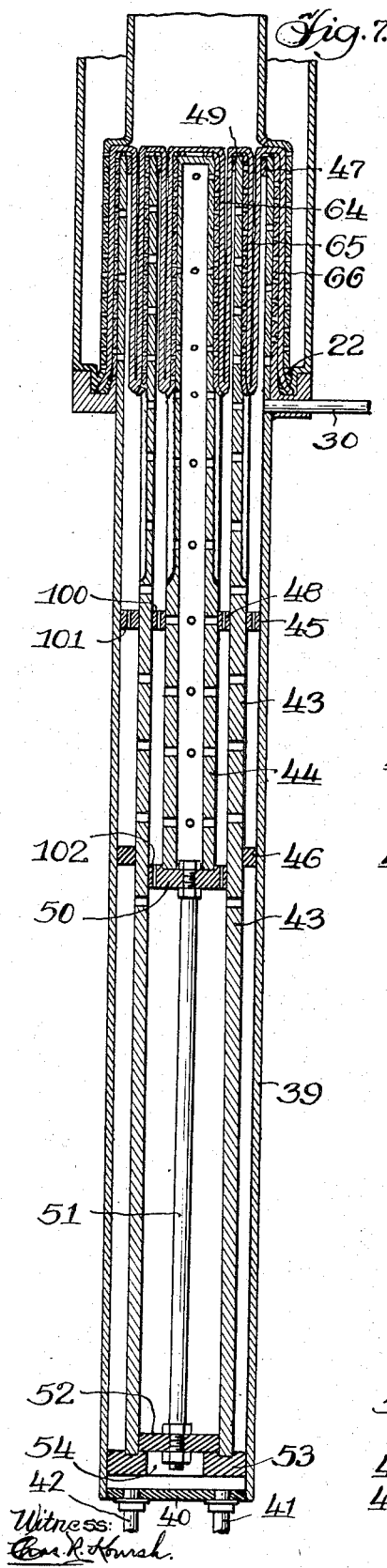
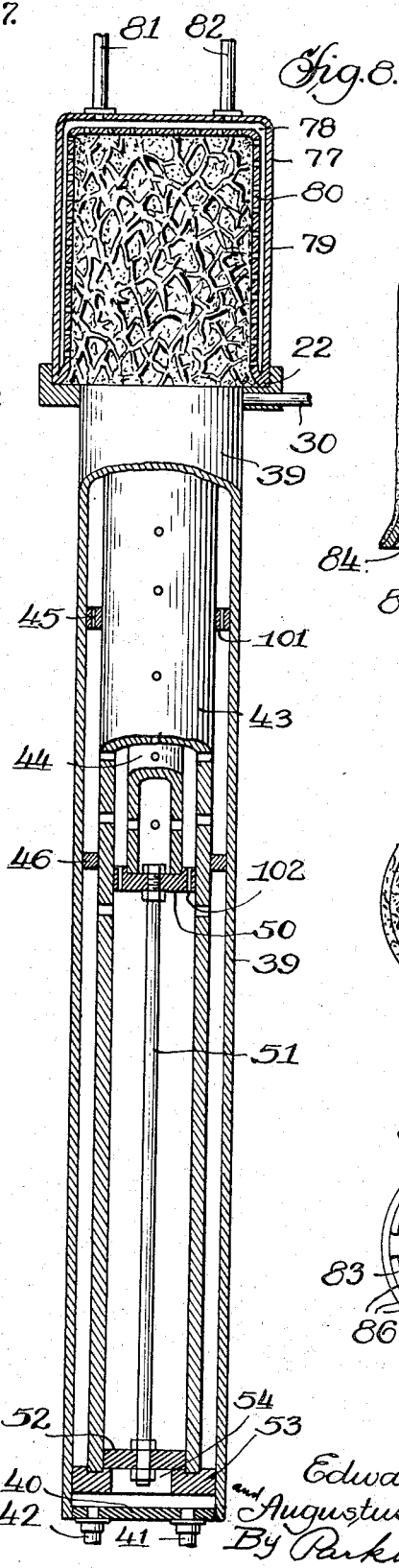
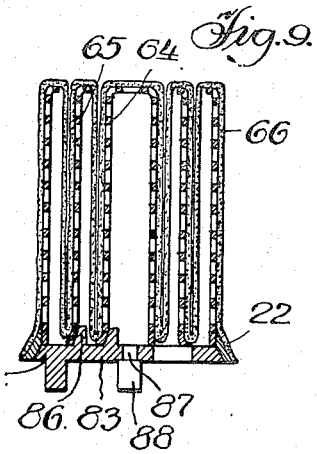
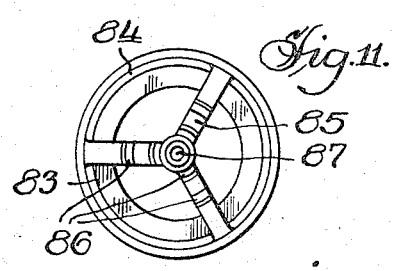
INVENTORS.
Edward C. Sloan,
Augustus H. Eberman
By Parkinson & Lane
Attys.

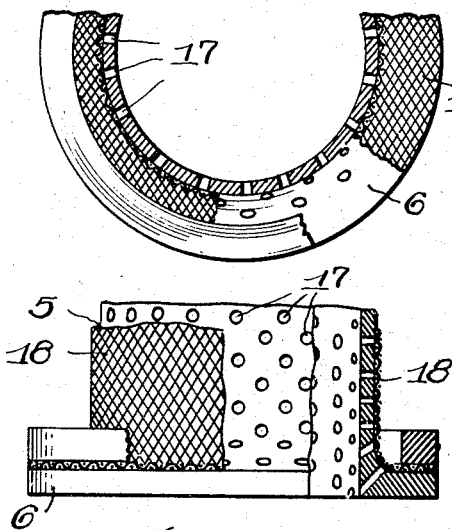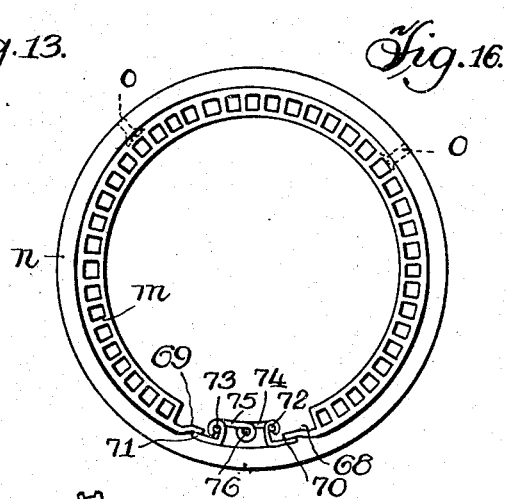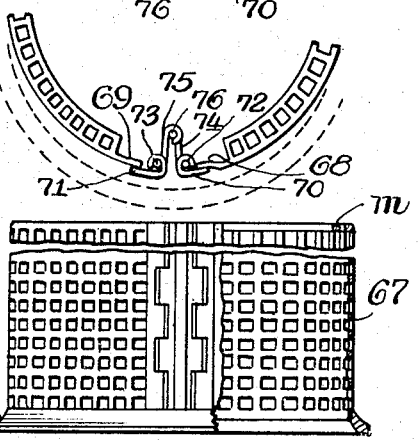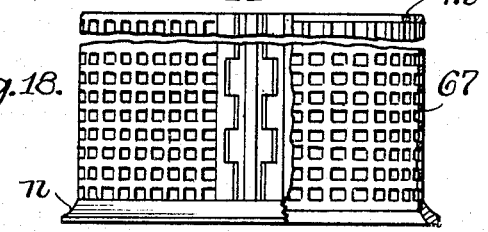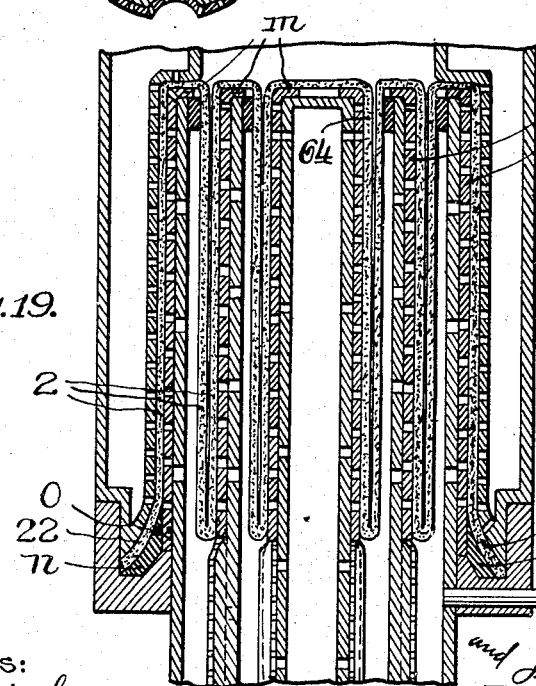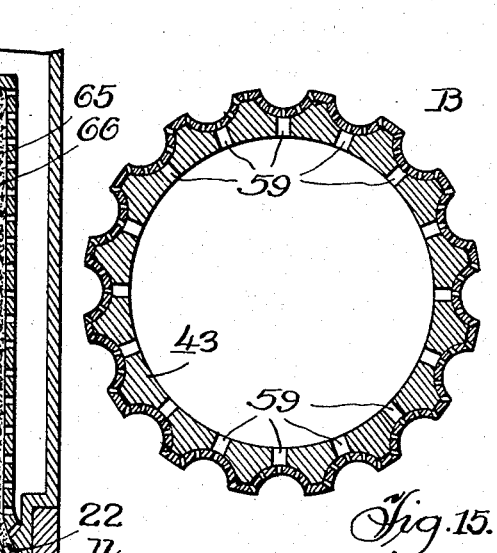

Patented Dec. 28, 1943

2,337,575

UNITED STATES PATENT OFFICE 2,337,575

APPARATUS FOR MAKING FILTERS AND THE LIKE

Edward C. Sloan and Augustus H. Eberman, Geneva, Ill., assignors to Jesse B. Hawley, Geneva, Ill.

Original application July 15, 1938, Serial No. 219,454. Divided and this application November 17, 1941, Serial No. 419,434

15 Claims. (Cl. 92—54)

This invention relates to apparatus for making filters adapted for filtering oil, liquids and other fluids, and which filters are made from accreted fibrous pulp.

This application is a division of our copending application Serial No. 219,454, filed July 15, 1938.

Our invention comprehends apparatus for making a filtering member that is economical to manufacture, simple in construction, of ample strength, efficient in operation, easy of replacement, and yet one that can be thrown away and quickly replaced with a new one at low cost when required, and particularly to the apparatus for making the same.

Our invention further includes, novel folding means for folding the wet pulp carcass into a desired form after being accreted, means for handling the folded wet carcass, and transferring means for transferring the wet carcass from one part to the other during its production.

Our invention may also be used for filtering other fluids than oil, as well as for separating one fluid from another.

Our invention also includes apparatus for forming on the surface of the parts of a filter member, of valleys, furrows, grooves, ridges and the like, either straight or irregular, such that the rough or irregular surfaces will permit the passage in a general longitudinal direction of the oil or other fluid being filtered when said surfaces are in direct contact with other faces such as the interior walls of the filter casing, other of said surfaces, and the like, thus eliminating the necessity of separate supporting members.

Our invention further includes apparatus for accreting a wet fibrous carcass onto a porous former, removing the carcass from the former, and a folder for collapsing sections of the carcass one within another.

Other objects, advantages and capabilities inherently possessed by this invention will later become more readily apparent.

In the drawings:

Figure 1 is a more or less diagrammatic vertical cross-section through the pulp bath tank and showing in general the apparatus for making our novel fibrous pulp oil filter members.

Fig. 2 is a side elevation of the wet accreted carcass before being folded into finished shape.

Fig. 3 is a perspective view of a filter member made in accordance with our invention.

Fig. 4 is a longitudinal vertical section taken on a median plane of one of our felting forms and showing the wet fibrous carcass accreted thereon.

Fig. 5 is a longitudinal vertical section taken on a median plane through the transferrer and showing the wet carcass on the inner surface thereof after having been removed from the felting form and prior to its application upon the folder.

Fig. 6 is a fragmentary longitudinal vertical section taken on a median plane through the folder of our invention and showing the carcass applied thereto by the transferrer, but omitting for conservation of space the lower portion of the folder and showing the folder in its extended position prior to the folding operation.

Fig. 7 is a longitudinal vertical section of the folder including the lower portion omitted from Fig. 6, and showing the movable parts of the folder and the carcass in the position and condition occupied after the folding operation has been effected and with the transferrer still in position around the folded carcass.

Fig. 8 is a view partly in side elevation and partly in section of the parts shown in Fig. 7, with the transferrer of Fig. 7 removed and a second transferrer in position over the folded carcass for removing the same from the folder.

Fig. 9 is a vertical section taken on a median plane through the folded carcass and showing the drying forms in position therein and the carcass and drying forms in position upon the centering plate.

Fig. 10 is a plan view looking down upon the top of Fig. 9 either before or after drying.

Fig. 11 is a plan view looking down upon the centering plate.

Fig. 12 is a fragmentary view partly in section of the lower portion of the felting form.

Fig. 13 is a fragmentary plan view of Fig. 12.

Fig. 14 is a horizontal transverse section taken on line 14—14 of Fig. 6 but through the folding form only.

Fig. 15 is a horizontal transverse section taken on the line 15—15 of Fig. 6 but through the folding form only.

Fig. 16 is a plan view looking down on the top of one of the drying forms in extended position.

Fig. 17 is a fragmentary plan view of the hinged portions of the drying form of Fig. 16 but showing the same in collapsed position.

Fig. 18 is a side elevation, partly in section and partly broken away of Fig. 17.

Fig. 19 is a fragmentary vertical longitudinal section through the folder, folded carcass and lower portion of the transferrer, and showing the drying forms in position therein prior to removal of the folded carcass from the folder.

The formation of our improved filter members is accomplished in general by first accreting onto a suitable perforated form from a bath of fibres a wet carcass of the desired thickness and elongated, but having a plurality of cylindrical portions, each succeeding cylindrical portion being greater in diameter than the preceding cylindrical portion and of such length that while still wet this carcass will be folded into collapsed form, with the cylindrical portions of different diameters concentric to each other but integrally connected together. After the carcass is felted onto the felting form the latter is raised out of the bath and the carcass removed from the felting form by a transferrer, by which it is transferred to the folder and folded while wet into the shape referred to. While we have shown in the drawings the various cylindrical portions as being of cylindrical outer contour except for two that are longitudinally fluted, we wish it understood that these portions of different diameter may be of any suitable cross section other than cylindrical, such as square, oblong, elliptical, rectangular or, if desired, of irregular contour or conical.

Referring more in detail to the drawings, it will be seen in Fig. 1 that in one embodiment of our invention we provide a felting form F which is formed of a plurality of tubular portions 1, 2, 3, 4 and 5 of any suitable cross-sectional shape, and each tubular portion from 1 to 5, respectively, being of greater diameter than the one preceding the same. In other words, these tubular sections 1 to 5 each increase in diameter respective to the one preceding it from the free end of the felting form to the base 6. The base 6 of felting form F is securely fastened by bolts or other suitable means to a plate 7 angularly formed on the free end of the supporting arm 8, which latter is suitably pivoted at 9 to the lug 10 fixed to one of the side walls of the tank 11, which tank contains a fibrous bath 12. This bath consists of the fibrous material being used immersed and thoroughly mixed in a suitable proportion of water.

A longitudinal cross-section through a felting form is shown in Fig. 4, in which the tubular portions 1, 2, 3, 4 and 5, as well as the closed end 16, are formed with a large number of openings 17, over which is placed a covering of wire mesh cloth 18 to prevent the pulp from passing through said openings.

The felting form F is shown in Fig. 4 with the wet carcass 20 after being felted thereon and just before removal therefrom by the main transferrer 23. The base or lower portion of the wet carcass, as seen in Fig. 4, is formed with the basal flange 22, which flange, as pointed out later herein, is used for clamping the filter element in position in the filter casing. The felting form, the transferrers and the folder of our invention may be made of brass, copper or other suitable material, preferably a material that will be rust resistant.

Referring again to Fig. 1, as soon as the felting form has been in the bath a sufficient length of time to receive the desired thickness of fibre deposits thereon to form a carcass of suitable thickness, the felting form F with the accreted fibres thereon, is swung upwardly around fulcrum 9 out of the bath and into the vertical position shown in solid lines. The position of the felting form in the bath is shown in dotted lines. As soon as the felting form F with carcass 20 accreted thereon has reached the vertical position referred to above, the main transferrer 23 (shown in detail in Fig. 5) is lowered thereover and an air suction created therein through the suction pipe 24 in order to hold the carcass 20 in gripping engagement with the transferrer and tend to release it from the felting form. This release from the felting form is further assisted by blowing air into the felting form through the air pipe 15, after which the main transferrer 23 is raised upwardly away from the felting form to remove the carcass from the latter and permit the felting form to again be swung downwardly into the bath to have formed thereon a carcass. The transferrer 23 may be raised and lowered by any suitable means, we, for illustrative purposes only, having shown in Fig. 1 a cable 25 passing over pulley 26 and secured at 27 to the transferrer 23. Any suitable power may be applied to the cable 25 to raise and lower the same as desired. We also wish it understood that any other suitable and adaptable form of means for raising and lowering the transferrer may be used without departing from the spirit of our invention.

In the foregoing it is to be understood that as soon as the fibres have been accumulated on the exterior of the felting form to the desired thickness, the suction through pipe 14 will be maintained until the felting form with its wet carcass thereon has moved out of the bath so as to prevent the deposited fibres from being washed away from the felting form. As soon as the felting form has moved out of the bath the suction through pipe 14 will be stopped, or if it is desired to remove more of the water from the carcass on the felting form the suction may be continued somewhat longer, but it is essential that before the transferrer 23 after being applied to the wet carcass is moved upwardly to remove the carcass from the felting form, the suction must have been cut off and, if desired, some air pressure applied as referred to above.

The felting forms F may be arranged in batteries of any desired number in order to speed production. A corresponding battery of transferrers 23 with a transferrer for each felting form will likewise be provided for removal of the wet carcasses from the felting forms and to transfer them to the folders. After the felting form F (or battery of felting forms) has again been lowered into the bath the folder S is moved on its carriage 28 to the left as viewed in Fig. 1, so as to come directly under its corresponding transferrer 23. If a plurality of transferrers and felting forms are used, a corresponding number of folders will likewise be used for obvious reasons. As soon as the folder S is directly under the transferrer 23, the latter will be lowered onto the folder and when the wet carcass is in place therein the suction through pipe 24 of the transferrer will be cut off and a desired amount of air pressure will be introduced into the interior of the transferrer through air pipe 29, and at the same time suction will be applied to the interior of the folder through suction pipe 30. The transferrer 23 will then be raised to its elevated position in Fig. 1, the wet carcass at the same time remaining on the folder S to be folded as later herein described.

The main transferrer 23, as shown in Fig. 5, comprises the outer shell 31 and the inner shell 32, and the end wall 33, to form between the walls 31, 32 an air space 34, to which are connected suction pipe 24 and the air pipe 29, so that upon selective and individual manipulation of these pipes the space 34 within transferrer 23 may have applied thereto either a suction or air pressure as desired, the suction being to facilitate removal of the wet carcass from the felting form and the air pressure being to facilitate removal of the wet carcass from the transferrer to the folder. The inner tubular wall 32 of the transferrer 23 is formed with a suitable number of openings 35, so that the suction or air pressure within chamber 34 will be effective upon the wet carcass in either removing it from the felting form by suction or placing it upon the folder by air pressure. The lower end of the transferrer 23 is suitably formed at 36 to fit over and press out smooth the basal flange 22 of the wet carcass and at 37 with an inset shoulder and depending portion to fit over and within the ring 38 on the lower end of the felting form F, ring 38 serving as a guide for the lower end of the transferrer.

The folder S is shown in detail in Fig. 6, except that the lower portion of the same has been omitted for convenience, this lower portion, however, being shown in each of Figs. 7 and 8. In describing this folder reference will be made to Figs. 6, 7 and 8, in which the folder is shown as comprising a lower outer casing 39 closed at its lower end by end wall 40, through which extend the air pipe 41 and suction pipe 42. Slidably mounted within outer casing 39 is the intermediate tubular section 43, within the latter of which in turn is slidably mounted the inner hollow tubular section 44. Fixed to outer surface of the intermediate section 43 are the two spaced apart rings 45 and 46, the outer edges of which have a snug sliding fit with relation to the inner surface of the outer casing 39. These rings are spaced apart such distance that when the intermediate section 43 is extruded as far as it will go, the upper edge of ring 45 will contact the annular flange 47 fixed to the interior of the upper end of the outer casing 39, and when this contact takes place the upper edge of ring 46 will be just below the open inner end of suction pipe 30 as seen in Fig. 6.

When ring 45 contacts flange 47 the upper end portion of the intermediate section 43 will have protruded above the top of the outer casing 39 a distance equal to the length of the tubular stepped portions 3 and 4 of the felting form F. At the same time under the air pressure introduced through air pipe 41, the inner section 44 of the folder will have been extruded until the upper edge of ring 48 will have contacted the lower edge of annular flange 49 formed on the interior of the upper end of the intermediate section 43, and the inner section 44 has protruded a distance equal to the length of the tubular portions 1 and 2 of the felting form. Ring 48 is fixed to the exterior of the inner section 44 and has a snug sliding fit with the interior of the intermediate section 43. Also fixed to the bottom end of the middle section 44 is a circular end plate 50, the outer edges of which have a snug sliding fit with the inner walls of the intermediate section 43. Securely fixed to end plate 50 by means of suitable nuts and threads on each side of plate 50, is the rod 51, which at its lower end is fixed to the piston 52 by a nut threaded to rod 51 on each side thereof. It will thus be seen that the two elements 50 and 52 are rigidly connected together for simultaneous endwise movement and serve as two piston heads slidably mounted upon the interior of the intermediate member 43.

The lower end of the intermediate tubular member 43 has fixed thereto an annular plate member 53, the outer edge of which has a snug sliding fit with relation to the inner walls of the outer casing 39. Plate 53 has an opening 54 in its central portion to receive the lower nut on rod 51, and also permit the passage of air therethrough to move piston head 52 upwardly when air pressure is introduced through pipe 41, and to move the same downwardly when suction is applied through pipe 42. Assuming the parts in the position shown in Fig. 7, the application of air pressure through pipe 41 will force piston head 52 with the inner member 44 and the plate 53 with the intermediate member 43 upwardly to extrude said inner and intermediate portions until rings 48 and 45, respectively, hit flanges 49 and 47, which will bring the parts into position shown in Fig. 6, and which position these parts occupy when the main transferrer 23 is introduced over the folder S to apply the wet carcass thereto as shown in Fig. 1.

In order to permit a desired amount of suction to be applied to the interior of the folder when the main transferrer 23 is applying the wet carcass thereto, suction is applied through the suction pipe 30 which, as noted in Fig. 6, is above the ring 46 and piston head 52, thus enabling this suction to be applied to the offset tubular sections corresponding to sections 1, 2, 3, 4 and 5, simultaneously with the application of the air pressure below plate 53 and piston head 52 to prevent the collapsing or lowering of the inner section 44 and the intermediate section 43 while receiving the wet carcass. To permit this suction through pipe 30 to be applied throughout the entire length in fully extended position from ring 46 to the upper end of inner section 44, the various parts are provided with a suitable number of openings through which the suction will to a sufficient degree act upon a wet carcass to hold it to the folder when transferred thereto from the transferrer 23.

While any suitable number of holes may be used as desired, we have found it very satisfactory to provide approximately twelve ⅛ inch diameter holes 55 through the walls of the upper smallest section 1' of the inner section 44; approximately four ¼ inch diameter holes 56 in each of the valleys of the fluted portion A; approximately twelve ¼ inch diameter holes 57 in that portion of the lower end of inner section 44 falling below ring 48; approximately twelve ⅛ inch diameter holes 58 in that portion of the intermediate section 43 falling immediately opposite that portion of the inner section below ring 48 when extended; approximately four ¼ inch diameter holes 59 in each of the valleys of the fluted portion B; approximately twelve ⅜ inch diameter holes 60 in that portion of the intermediate section 43 lying between rings 45 and 46; and approximately eighteen ⅛ inch diameter holes 61 in that portion of the outer shell 39 lying between flange 47 and ring 46 when the folder is extended. It is, of course, understood that these sizes and number of holes are only approximate and may be changed in number and dimension as desired within the limits of successful operation.

The fluted portions referred to are shown in cross-sectional detail in Figs. 14 and 15, Fig. 14 being a section on the line 14, 14 of Fig. 6 and Fig. 15 being a section on the line 15, 15 of Fig. 6. The fluted section of which a cross-section is shown in Fig. 14, is designated generally as A, and the fluted section of which a cross-section is shown in Fig. 15 is designated generally as B. These fluted sections are formed in the exterior face of the metal of the larger portion of the inner section 44 and the larger portion of the intermediate section 43, respectively, as indicated in Fig. 6, and are provided to assist in the stripping action when folding the wet carcass in the folder, to-wit, the stripping of the wet carcass from the adjacent faces of the folder during the folding action, which folding action will be better understood from an inspection of Figs. 6 and 19, Fig. 6 showing the wet carcass and associated parts of the folder before the folding operation begins, and Fig. 19 showing the folder and associated parts upon completion of the folding movement. Fig. 6 and Fig. 19 show the transferrer 23 as being still in position both before and after the folding operation, but this transferrer may, if desired, be removed and the folding operation take place after removal of this transferrer. This is a matter of choice and can be operated either way as desired.

Referring to Fig. 14, the fluted section A is provided with any suitable number of flutes or valleys 62, eight being shown in the drawings for illustrative purposes only, and this fluted section is covered with a thin perforated metal covering 63 or other suitable open-work material, preferably having a large number of small openings therein, it being remembered, as pointed out above, that openings are provided from the bottom of each of the valleys or fluted portions 62 to the interior of the inner telescoping section 44. The fluted section B being of a larger diameter will have a larger number of flutes or valleys, these numbering, as shown in Fig. 15, sixteen, this fluted section otherwise being formed and covered with perforated thin metal as described in connection with fluted section A in Fig. 14.

Due to the more or less fragile or crushable nature of the wet carcass after being folded, we prefer to provide perforated drying forms, which are shown in Figs. 7, 9, 16, 17, 18 and 19. Drying forms 64, 65 and 66, as seen in Fig. 9, are provided respectively for the inner, intermediate and outer concentric sections of the folded filter member. The construction of these drying forms is shown in detail in Figs. 16, 17 and 18 as comprising the cylindrical side wall of open mesh metal 67 having at its top the inturned flange m, the vertical edges 68 and 69 of the side wall having fixed thereto the angular portions 70 and 71, respectively, which angular portions carry the extending fulcrum pins 72 and 73, which in turn are fulcrumed to the plates or hinge members 74 and 75, which in turn are hinged together by means of the hinge pins 76. This hinged construction in effect forms a toggle and extends from the bottom to the top of these drying forms so that when the folded filter member is dried they may be easily removed therefrom by swinging hinge members 76 inwardly from the position shown in Fig. 16 to the position shown in Fig. 17, which will decrease the diameter of these forms and permit them to be withdrawn longitudinally from the folded and dried filter member. Also, if desired, they may be removed from the folded filter member while still wet. As shown, these drying forms are formed of metal having square openings, but this is merely for convenience and any shape or suitable size of such openings may be employed as desired.

As seen in Figs. 16–19, the drying form for the outer wall has a continuous bottom flange n with an outer face corresponding in inclination to the adjacent bottom edge of the wet carcass forming the supporting flange for the filter member. This bottom flange is secured by a pair of spaced screws, bolts or the like o to the bottom edge of the wall 67 of the drying form opposite the toggle hinges but free throughout the rest of its circumference to permit the drying form to move inwardly therefrom when being collapsed. The drying forms for the intermediate and inner portions of the wet folded carcass may have their lower edges straight as shown in Fig. 19, or slightly curved, if desired, as shown in Figs. 6, 7 and 9.

These drying forms are applied to those portions of the folder corresponding to sections 1, 3 and 5 of the felting form shown in Fig. 1 by slipping them longitudinally thereover. These drying forms thus applied are shown at 64, 65 and 66, respectively, in Fig. 6, before the wet carcass has been folded, and in Figs. 7, 9 and 19 after the wet carcass has been folded, and before the wet carcass has been removed from the collapsed folder in Figs. 7 and 19, and after such removal in Fig. 9. The wet carcass is preferably removed from the collapsed folder by a second transferrer 77, which has a hollow space 78 between its outer wall 79 and its perforated inner wall 80, to which hollow space air pressure may be introduced through air pipe 81 or suction through suction pipe 82. The transferrer 77 is of a shape and size to fit more or less closely over the exterior of the folded wet carcass after removal of the first transferrer 23, which latter, as stated above, may be removed either before or after the folding operation as desired.

In removing the folded wet carcass from the folder, suction through pipe 82 will be applied to the inner space 78 of transferrer 77, so as to make the exterior of the carcass adhere thereto, after which the carcass and transferrer will be lifted vertically upward to move the folded carcass and the drying forms together away from the folder, after which the wet carcass in the transferrer 77 will be lowered onto a centering plate 83, which, as shown in Fig. 11, is of spider formation having the exterior ring portion 84, which on its outer edge is outwardly and downwardly beveled as shown in Fig. 9, and which is provided with the radial arms 85, three or more in number as desired, which arms have the upstanding lugs 86, which are tapered on their outer faces to receive the correspondingly tapered lower ends of the drying forms. These centering plates insure that the several concentric cylinders of the filter member will be held properly in position and not permitted to become collapsed or distorted before drying. In the center of this centering plate may be provided an opening 87, if desired, to more freely permit heated air to enter the interior of the middle section of the folded filter member, air also freely passing upwardly into the interior of the intermediate and outer sections between the spider arms 85. These centering plates are provided with legs 88 so that they will stand up away from the carriage, table or other surface on which they may be resting during drying to permit free entry of air to the interior of the filter member while drying. If desired, these wet carcasses may be placed on an endless belt and have a continuous movement through the heated drying compartment.

The various steps in our improved method of forming our improved filter member will be readily understood from the foregoing, and will be seen in general to consist of first depositing by suction onto an elongated felting form a wet carcass of accreted, interlaced and integrated fibres having sections of stepped and varying diameter, and then moving such felting forms and wet carcass out of the bath to an upright position, and then applying over the wet carcass on the felting form a first transferrer, lifting the wet carcass from the felting form by such transferrer with the application of suction or pressure as desired, transferring the wet carcass to an extended folder and applying it thereto, and over which folder at certain sections have been applied open mesh drying forms, then collapsing the folder to fold the wet carcass into a plurality of integrally united concentric cylinders or other tubular forms, removing the first transferrer either before or after the folding operation, applying a second transferrer after the folding operation to the exterior of the folded wet carcass, then removing the second transferrer and the wet carcass and drying forms from the folder and transferring them to centering plates, and then placing said centering plates in drying chambers and drying the same to produce fibrous filter members having a plurality of concentric porous tubular portions for filtering liquids, and a flange whereby such filter may be readily clamped in position and in a filter casing, and after its usefulness has expired be readily removed therefrom and replaced by a new filter. The flange for clamping the filter member between suitable clamping portions in a filter casing is shown at 22 in Figs. 2, 3, 8, 9 and 19.

As seen in Figs. 2, 3, 6, 7 and 19, inner section $a$ of the wet carcass retains its original form and shape, and during the folding operation which, as is understood, is accomplished while the carcass is still wet, the folding occurs throughout the folding sections $b$ and $d$ so that in effect both of sections $b$ and $d$ are turned inside out so that section $b$ lies concentric with and outside of section $a$, section $c$ lies concentric with and outside of section $b$, section $d$ lies outside of and concentric with section $c$, and section $e$, forming the exterior of the filter member, lies concentric with and outside of section $d$, see particularly Figs. 2 and 3.

The extending of the parts of the folder may be accomplished, as stated earlier herein, by introducing air through air pipe 41, which will force plate 53 with its attached intermediate section 43, and piston head 52 and its attached inner section 44, upwardly until rings 45 and 48 strike flanges 47 and 49, respectively. By permitting the continuance of a certain amount of air pressure through air pipe 41, these parts will be held in extended position even while a greater or less suction is being applied through suction pipe 30 to assist in holding the wet carcass to the folder and freeing it from the interior of the first transferrer. To effect collapsing of the folder during the folding operation it is only necessary to stop the air pressure through pipe 41 and either utilize the weight of the telescoping parts or apply any desired amount of suction through pipe 42, to move the telescoping parts inwardly from the position shown in Fig. 6 to the position shown in Fig. 7, a slight amount of suction being maintained on suction pipe 30 or not as desired during this folding operation. We have, however, found it preferable to maintain a slight amount of suction on pipe 30 during folding. The suction from pipe 30 to the various sections of different diameter of the folder is made possible because of the inter-communicating openings between the various parts, as clearly seen in Fig. 6. For illustration, any suitable number of openings 100 will be formed in ring 48, also openings 101 in ring 45, and openings 102 in end plate 50.

The folder may be collapsed also when the main transferrer is still in place by introducing air pressure through pipe 29 into the space 34 within the transferrer to hold the wet carcass with more or less pressure against the folder and to force the telescoping parts into collapsed position. At the same time air is allowed to escape through suction pipe 30 and suction pipe 42, it being understood that during this time no air pressure will be introduced through air pipe 41.

While we have shown and described herein certain embodiments and steps of our invention, we wish the same to be understood as illustrative only and not as limiting our invention in which said embodiments and steps are susceptible of modification and change without departing from the spirit of our invention.

Having now described our invention, we claim:

1. A folder for an accreted hollow pulp carcass comprising a plurality of hollow sections telescopically slidable one within another and having different diameters, said sections each formed with openings through its walls, means for limiting the amount of extension of said sections, means for applying pressure within said sections to move them to extended position, and means for moving said sections to collapsed position.

2. A folder for an accreted hollow pulp carcass comprising a plurality of hollow sections telescopically slidable one within another and having different diameters, said sections each formed with openings through its walls, means for limiting the amount of extension of said sections, means for applying pressure within said sections to move them to extended position, means for moving said sections to collapsed position and open-work drying forms removably positioned on the exterior of certain of said sections.

3. A folder for folding filter members comprising a plurality of hollow sections telescopically slidable with relation to each other, said sections when extended having stepped portions of different diameters adapted to receive a wet fibrous pulp filter member carcass of internal contour similar to that of the external contour of the folder, the walls of said sections having openings therein through which suction or pressure may be applied to the inner walls of the carcass, means for forcing said sections to extended position, and means for enabling the sections and carcass thereon to be collapsed, during which collapsing movement those portions of the wet carcass on alternate sections will be progressively turned inside out so that when the folder is completely collapsed the carcass will be shortened from its original elongated form to short form, with a plurality of integral tubular filter portions positioned one within the other to provide a filtering surface of large area.

4. Apparatus for forming a filter member from an accreted hollow fibrous pulp carcass, comprising a folder having a plurality of hollow sections having different diameters and telescopically slidable one within another, said sections when protruded to their extended position receiving the fibrous pulp carcass, said sections being telescopically retractable into nested concentric position and while being retracted folding portions of the carcass inside out whereby is formed a folded accreted fibrous pulp filter having concentric integral sections increasing in diameter from the inside section to the outside.

5. Apparatus for forming a filter member from an accreted hollow fibrous pulp carcass, comprising a folder having a plurality of hollow sections having different diameters and telescopically slidable one within another, said sections when protruded to their extended position receiving the fibrous pulp carcass, said sections being telescopically retractable into nested concentric position and while being retracted folding portions of the carcass inside out whereby is formed a folded accreted fibrous pulp filter having concentric integral sections increasing in diameter from the inside section to the outside, means for limiting the amount of extension of said first mentioned sections and means for stopping the retracting movement when said first mentioned sections are fully nested.

6. Apparatus for forming a filter member from an accreted hollow fibrous pulp carcass, comprising a folder having a plurality of hollow sections having different diameters and telescopically slidable one within another, said sections when protruded to their extended position receiving the fibrous pulp carcass, said sections being telescopically retractable into nested concentric position and while being retracted folding portions of the carcass inside out whereby is formed a folded accreted fibrous pulp filter having concentric integral sections increasing in diameter from the inside section to the outside, means for limiting the amount of extension of said first mentioned sections, means for stopping the retracting movement when said first mentioned sections are fully nested, and means for causing the first mentioned sections to move outwardly into extended position.

7. Apparatus for folding a hollow porous accreted fibrous pulp article, comprising a folder having a plurality of hollow sections of different diameters and telescopically slidable one within another, said sections when extended receiving the hollow unfolded article and when collapsed one within another having positioned thereon the folded article, whereby during the inward movement of the sections from extended to collapsed position the walls of the article will be folded to form a porous article with concentric integral sections of increasing diameter and folded one within another.

8. Apparatus for folding a hollow porous accreted fibrous pulp article, comprising a folder having a plurality of hollow sections of different diameters and telescopically slidable one within another, said sections when extended receiving the hollow unfolded article and when collapsed one within another having positioned thereon the folded article, whereby during the inward movement of the sections from extended to collapsed position the walls of the article will be folded to form a porous article with concentric integral sections of increasing diameter and folded one within another, certain of the folder sections being formed on the exterior face with fluted sections to facilitate the folding of the article.

9. Apparatus for folding a hollow porous accreted fibrous pulp carcass, comprising a folder having a plurality of hollow sections of different diameters and telescopically slidable one within another, some of said sections being fluted on the exterior face.

10. Apparatus for folding a hollow porous accreted fibrous pulp carcass, comprising a folder having a plurality of hollow sections of different diameters and telescopically slidable one within another, some of said sections being fluted on the exterior face, some of said sections having stops to limit the amount of extrusion of the sections.

11. Apparatus for folding a hollow porous accreted fibrous pulp carcass, comprising a folder having a plurality of hollow sections of different diameters and telescopically slidable one within another, some of said sections being fluted on the exterior face, the flutes on the fluted sections extending longitudinally of the section to facilitate the folding operation.

12. A folding apparatus comprising a member having telescopic sections over which an article to be folded will fit when the sections are extended, the sections being longitudinally slidable with relation to each other to fold the article longitudinally into sections one within another, the sections of the folded article being integrally connected end to end and increasing in size from the inside folded section to the outside one.

13. A folding apparatus comprising a plurality of sections telescopically slidable one within another, means for limiting the extent to which the sections may be inwardly collapsed, the sections when extended being adapted to receive an article to be folded and when collapsed to fold portions of the article inside out and form a folded integral article having tubular sections enclosed one within another and increasing in cross-dimension from the inside to the outside.

14. An apparatus for folding a fibrous article, comprising a plurality of hollow, perforated sections telescopically slidable one within another and over which an article to be folded will fit when the sections are extended, the sections when moving from extended to collapsed postion folding the article longitudinally into sections one within another integrally connected end to end and increasing in size from the inside folded section to the outside one, means for limiting the amount the folding apparatus may be extended, means for limiting the amount the folding apparatus may be collapsed, and means for applying suction to the interior of the folding apparatus to cause the article to have a tendency to adhere to the folding apparatus sections during the folding operation.

15. A folding apparatus comprising a telescopic member over which an article to be folded will fit when the member is extended, the telescopic member comprising a plurality of hollow sections longitudinally slidable one within another and movable from extended to collapsed position to fold the article longitudinally into shortened length, certain of the sections of the telescopic member during folding movement having means for turning the adjacent portions of the article inside out.

EDWARD C. SLOAN.
AUGUSTUS H. EBERMAN.